United States Patent [19]
Mathews

[11] 4,160,356
[45] Jul. 10, 1979

[54] DRIVE FOR MOWER
[76] Inventor: Bernard C. Mathews, 8606 Rte. 176, Crystal Lake, Ill. 60014
[21] Appl. No.: 875,747
[22] Filed: Feb. 6, 1978
[51] Int. Cl.² ............................................. A01D 56/26
[52] U.S. Cl. .......................................... 56/192; 56/6; 56/13.6; 56/295; 56/DIG. 4
[58] Field of Search ................. 56/192, 6, 13.5, 13.6, 56/13.7, 16.4, 295, DIG. 4, 10.8, 11.2, 11.3

[56] References Cited
U.S. PATENT DOCUMENTS

| | | | |
|---|---|---|---|
| 2,743,565 | 5/1956 | Dow | 56/11.2 |
| 3,306,016 | 2/1967 | Murphy | 56/10.8 |
| 3,391,522 | 7/1968 | Zweegers | 56/6 |
| 3,769,782 | 11/1973 | Cler | 56/51 |
| 4,007,578 | 2/1977 | Borstel, Jr. | 56/295 |
| 4,048,788 | 9/1977 | Kamlukin et al. | 56/11.3 |

FOREIGN PATENT DOCUMENTS 6604618 10/1956 Netherlands ............................ 56/192

*Primary Examiner*—Russell R. Kinsey
*Attorney, Agent, or Firm*—Kenneth T. Snow

[57] ABSTRACT

A drive for a mower of the type having a multiple number of vertically disposed drum cutters. The cutting elements are at the bottom of each drum and cut in a horizontal plane. A horizontally disposed pneumatic tired wheel is associated with and acts to impart rotation to each of the drum cutters. External drive is imparted to effect rotation of one of the pneumatic tired wheels. The other pneumatic tired wheels are mounted to have frictional circumferential engagement with each other and with the driven wheel to cause all of the wheels to be driven.

15 Claims, 8 Drawing Figures

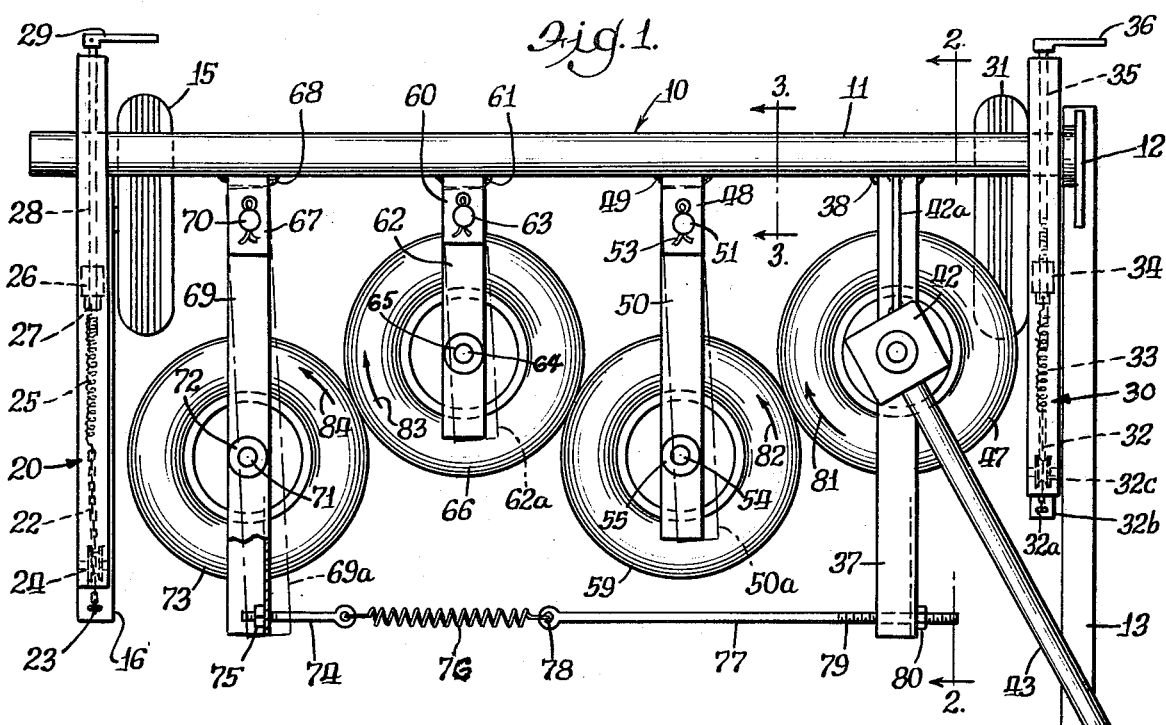
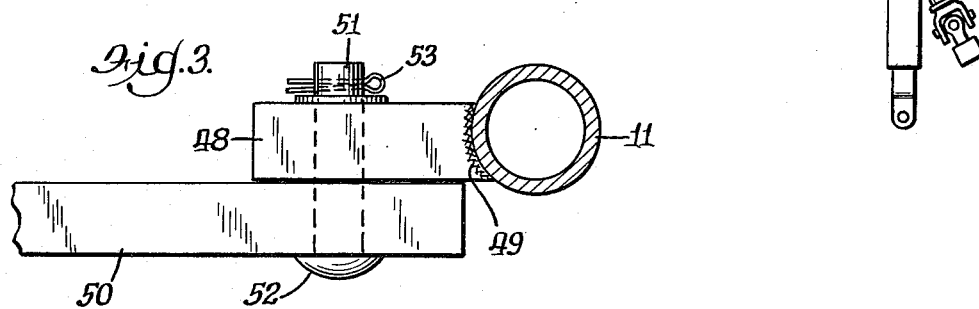
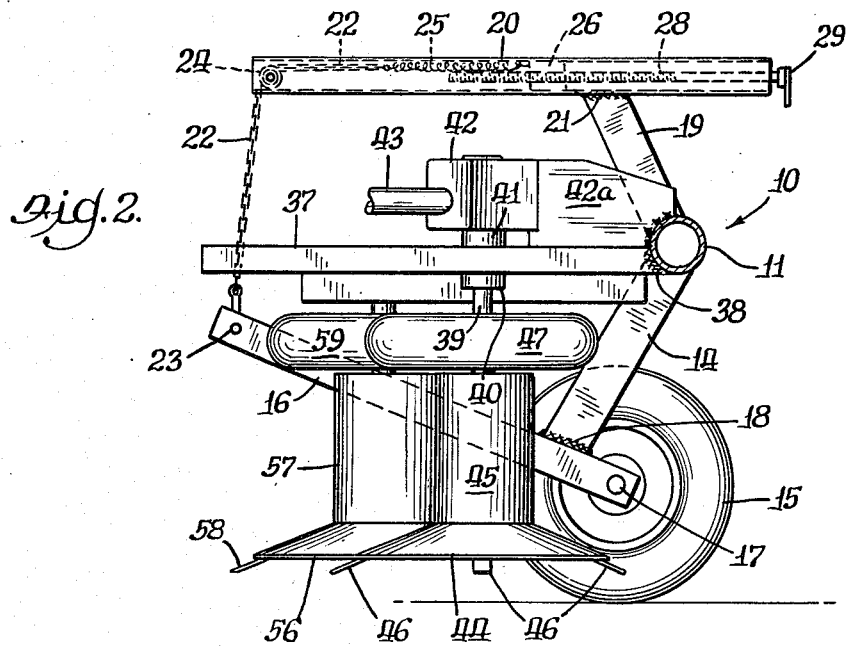

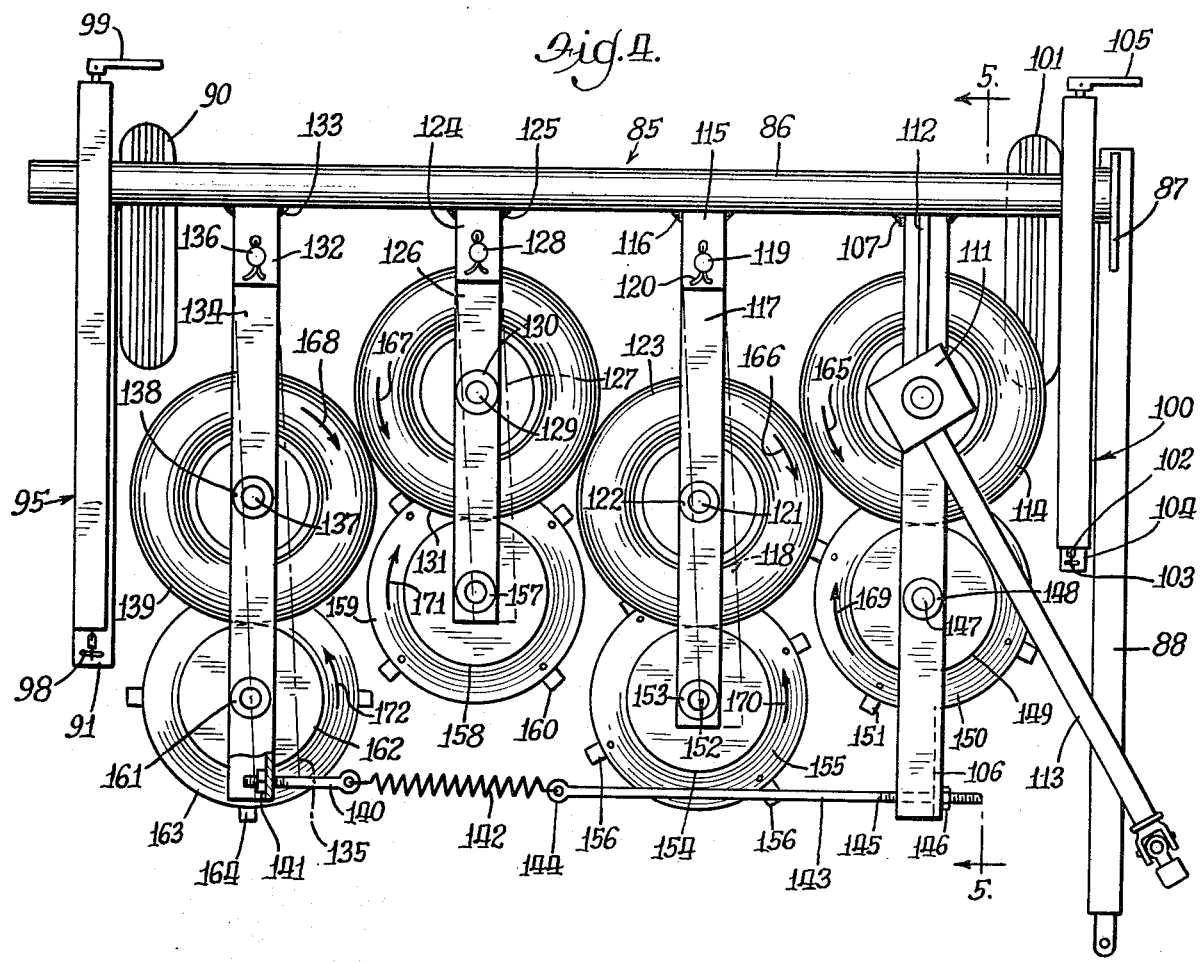

DRIVE FOR MOWER

BACKGROUND OF THE INVENTION

1. Field of the Invention

Mowers of hay have encompassed many types and forms of cutters. Some of these mowers have included mechanisms to windrow the cut hay. Recently mowers of the type depicted in the U.S. Pat. No. 3,391,522 to Zweegers and known generally as drum mowers have gained considerable acceptance because they are efficient and the cutters themselves inherently effect a windrowing without auxiliary mechanisms. Here, radially disposed cutters on adjacent horizontally disposed disc members which are rotating inwardly toward each other act to cut hay and deposit it first on the disc members for discharge and then in a windrow rearwardly at the point of juncture of the two discs.

Various drives, such as bevel gear sets, cooperative worm and worm gears, the V-belts have been utilized to effect rotation of the horizontally disposed cutting discs and their generally vertically upstanding center sleeves of large diameter. The cutters with their sleeves together resemble drums. The present invention is concerned with an economical and efficient way to rotatably drive the drums and the disc cutters of these defined mowers. This new drive utilizes the frictional engagement of a plurality of pneumatic tired wheels.

2. Description of the Prior Art

A patent search was conducted and the following United States patents were believed to be pertinent to the patentability of the device of this invention.

Despain et al, U.S. Pat. No. 879,089
Altheide, U.S. Pat. No. 1,130,365
Dow, U.S. Pat. No. 2,743,565
Swanson, U.S. Pat. No. Re. 25,379
Murphy et al, U.S. Pat. No. 2,872,770
Murphy, U.S. Pat. No. 3,306,016
Miles, U.S. Pat. No. 3,319,406
Zweegers, U.S. Pat. No. 3,391,522
Zweegers, U.S. Pat. No. 3,389,539
Zweegers, U.S. Pat. No. 3,443,369
Hanson et al, U.S. Pat. No. 3,445,991
Fischer, U.S. Pat. No. 3,486,269
Van Der Lely, U.S. Pat. No. 3,550,360
Wehde, U.S. Pat. No. 3,716,974
Kasberger, U.S. Pat. No. 3,735,572

The search patents fall in several general categories. Drum type mowers are depicted in the three patents to Zweegers and the patents to Van Der Lely and Kasberger. In all of these, there is no disclosure of any frictional drive. The Despain et al. and Swanson patents show multiple disc mowers with the cutting members of adjacent discs offset slightly so there is an effective overlap of the mowers and a guarantee that the mower will cut the entire transverse span of the mower discs without any hay missed at the adjoining edges. The Altheide, Dow, Murphy et al., Murphy, Miles and Hanson et al. patents relate to mowers and show the employment of frictional drive between elements disposed at right angles to one another. The Van Doorne, Fischer and Wehde patents show the employment of frictional drives between rotating wheel members lying in the same plane. The Van Doorne patent shows the use of a vertically disposed friction wheel driving vertically disposed ground engaging wheels. The Fischer patent shows a frictional drive between rubber rotors for use in toy operations. The Wehde patent uses cooperating pneumatic tires to grip and feed crop stalks into a sickle bar for the severing of the stalks. There is no prior art which shows or even hints at any of the drive mechanisms as disclosed in the subject patent application. Others have previously utilized pneumatic tires and other rubber surfaced wheels to transmit drive by frictional engagement. However, it appears that these prior users positioned their tires at right angles to one another and not in a single plane with the peripheries of the adjoining tires directly engaging one another. Tires driven at right angles wear excessively at their engaging surfaces whereas tires driving tires in a single plane wear very little. Applicant utilizes a single plane pneumatic tire drive.

SUMMARY OF THE INVENTION

A principle object of the present invention is to provide a novel drive for a drum type mower.

An important object of this invention is to provide a novel pneumatic tire frictional drive for the multiple cutters of a drum type mower.

Another important object of this invention is to provide a novel mower drive for a plurality of circumferentially engaged pneumatic tired wheels disposed in a generally horizontal plane and each of said pneumatic tired wheels arranged to impart rotational drive to a drum cutter.

Still another important object of this invention is to provide a novel mower drive in which a drum cutter is mounted coaxially of each of the pneumatic tired wheels and is carried on a single shaft.

Another and still further important object of this invention is to provide a novel mower drive in which each of a plurality of pneumatic tired wheels is adapted to frictionally engage the drum circumference of a drum cutter and impart drive thereto.

Still another important object of this invention is to provide a novel mower drive of the preceding object in which the diameter of the pneumatic tired wheel is greater than the diameter of the drum of the drum cutter to thereby drive the drum cutter at a substantially higher speed.

Another important object of this invention is to provide a novel mower drive in which drum cutters are frictionally driven by pneumatic tired wheels.

A further important object of this invention is to provide a novel mower drive of the preceding object in which a plurality of the drum cutters are canted in the same direction to permit overlap of adjacent cutters to ensure uninterrupted mowing over the transverse extent of the cutters without interference of the cutters at their adjoining edges.

Another important object of this invention is to provide a novel mower drive in which there is included means for exerting force between a plurality of pneumatic tired wheels disposed in a single plane to cause a driving by friction between the pneumatic tired wheels.

Still another important object of this invention is to provide a novel drive for side-by-side mower cutters in which each cutter has a pneumatic tired wheel associated therewith and conventional rotational drive imparted to an end one of the tired wheels, and spring means urging the remaining tired wheels against the driven tired wheel to frictionally cause the driving of the remaining tired wheels.

Another and still further important object of this invention is to provide a novel simple, efficient and economical drive for a drum type mower.

Other and further important objects and advantages of this invention will become apparent from the disclosures in the following specification and accompanying drawings.

IN THE DRAWINGS

FIG. 1 is a top plan view of the drum type mower incorporating one form of the novel drive of this invention.

FIG. 2 is a sectional view taken on the line 2—2 of FIG. 1.

FIG. 3 is an enlarged detail sectional view taken on the line 3—3 of FIG. 1.

FIG. 4 is a top plan view of a drum type mower incorporating another form of the novel drive of this invention.

FIG. 5 is a sectional view taken on the line 5—5 of FIG. 4.

AS SHOWN IN THE DRAWINGS

Figure 6:
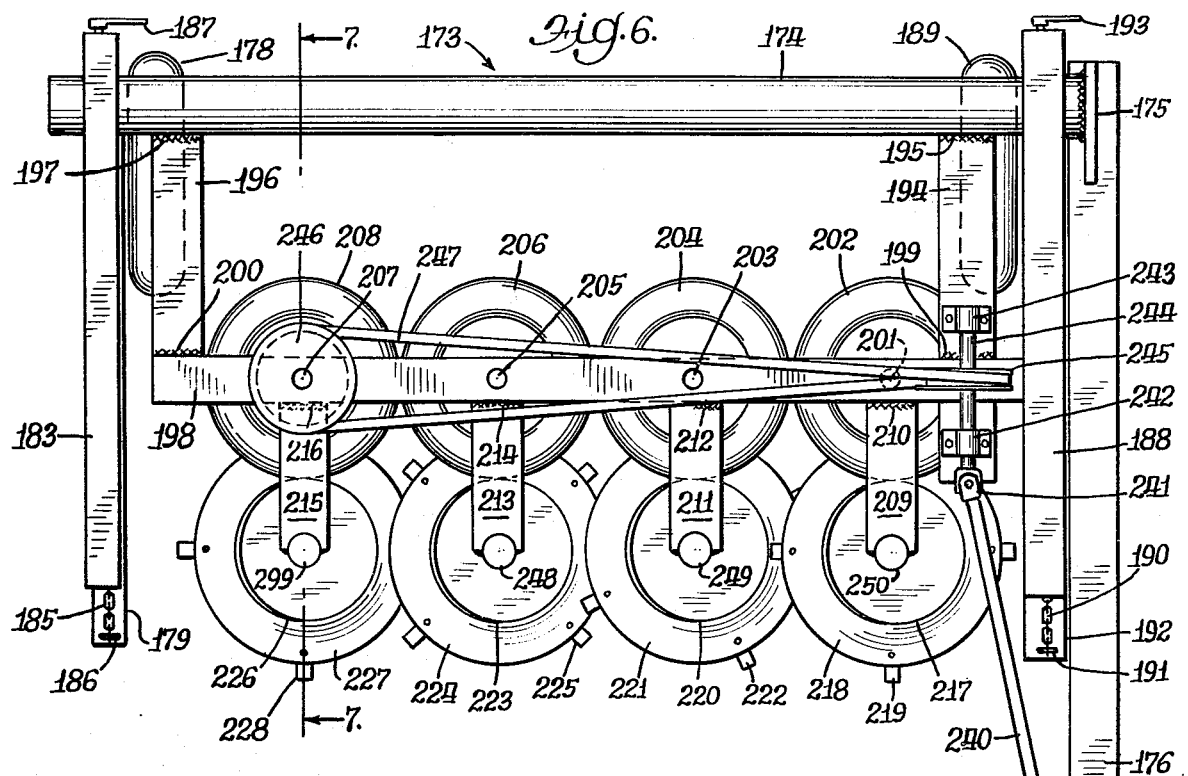
FIG. 6 is a top plan view of a drum type mower incorporating another form of the novel drive of this invention.

The reference numeral 10 indicates generally a wheel supported frame carrying the mower of this invention as shown in FIGS. 1 and 2. The frame 10 includes a transversely disposed tube member 11 which is in effect a torque tube about which all of the mower elements depend. One end of the tube 11 is provided with a vertically disposed plate 12 journaled thereon. A forwardly extending hitch member 13 is in turn welded to the plate 12 and acts as the means for pulling the mower by a tractor (not shown).

As best shown in FIG. 2, a downwardly and forwardly angled frame member 14 is welded to the tube 11 at the end thereof opposite the hitch member 13. A ground engaging and supporting wheel 15 is disposed adjacent the far end of the tube 11. An upwardly and forwardly angling frame member 16 journally carries the wheel 15 at 17 near its rearward end. The frame member 14 is affixed to the frame member 16 by a weld 18. Spaced above the unitary frame members 14 and 16 is an upwardly and forwardly angled frame member 19 which is also welded to the tube 11 and lies in a plane at or near the downwardly and forwardly angling member 14. A fore and aft extending member 20 is located above the wheel 15 and its mounting frame members. This fore and aft member 20 located at the top of the mower structure is joined by a weld 21 to the upper end of the frame member 19. A chain 22 has one end thereof hooked at 23 to the upper forward end of the frame member 16. A guide pulley 24 is journally mounted within the fore and aft member 20 and is adapted to guide the movement of the chain 22 from its position supporting the forward end of the frame member 16 upwardly and thence rearwardly through the fore and aft member as shown in FIG. 2. A spring 25 is fastened to the other end of the chain 22 and extends rearwardly within the fore and aft member 20. A block member 26 is slidable but not rotatably mounted within the fore and aft member 20 and has the other end of the spring 25 connected thereto at 27. A long screw member 28 has its forward end threadedly engaging the block 26 on the other side of the spring attachment. A hand lever 29 is mounted on the outer rearwardly extending end of the screw 28 and permits the hand adjustment of the screw within the block 26 to thereby adjust the tension of the spring 25. As the spring tension is increased there is a tendency to rotate the torque tube 11 in a clockwise direction as viewed in FIG. 2 which results in a raising of the mower elements to be subsequently described. Conversely, when the spring tension is decreased there is a tendency to permit the torque tube to rotate in a counter-clockwise direction for a lowering of the mower elements.

Another fore and aft extending member 30 is similar to the fore and aft member 20 and is located adjacent the hitch member 13 as shown in FIG. 1. A ground wheel 31 is provided beneath the fore and aft member 30 and is disposed parallel to the laterally spaced apart ground wheel 15 on the outer end of the frame 10. The ground wheels 15 and 31 thus provide the wheel support for the frame 10 of the mower of this invention. A chain 32, comparable to the chain 22 on the outer end of the machine, is adapted to be hooked at 32a to a frame member 32b which is similar in construction and disposition to the frame member 16. The chain 32 thereupon extends upwardly from the frame member 32b and into the fore and aft member 30 where it passes over a pulley 32c journaled for rotation within the fore and aft member 30. The pulley 32c guides the chain in its movement within the member 30. The end of the chain is fastened to a spring 33 which in turn is joined to a slidable but not turnable block member 34 contained within the fore and aft member 30. The block member 34 is comparable to the block 26 located within the fore and aft member 20. An elongated threaded rod or screw member 35 threadedly engages the block within the member 30. The screw is provided with a hand lever 36 by which the screw may be manually turned for greater or lesser engagement with the block 34. Such an operation causes the spring 33 to be more or less extended depending upon the direction of rotation of the hand lever 36. Thus the torque tendencies of both the inner and outer end of the tube 11 are adjustably controlled by the hand cranks 29 and 36 as just described.

A fixed forwardly extending arm 37 is welded at 38 at its rear end to the torque tube 11. As best shown in FIG. 2 a vertical shaft 39 is journally carried in and supported by the arm 37. A collar 40 is affixed to the shaft 39 beneath the arm 37 and a comparable fixed collar 41 is provided on the shaft 39 on the top side of the arm 37. With this construction the collars 40 and 41 restrain the vertical shaft 39 from having separate vertical movement relative to the arm 37. A gear box 42 is mounted above the collar 41 and has the shaft 39 projecting upwardly therein. A platelike reinforcing member 42a is welded at one end to the box 42 and at its other end to the tube 11. This gives the necessary stability to the gear box 42. A drive shaft 43 as shown in FIG. 1 is angled forwardly and laterally for a connection to a power take-off shaft of a tractor (not shown). Thus the drive shaft 43 brings rotational drive to the gear box 42 which contains elements to transmit rotational drive to the vertical shaft 39.

A disc member 44 is affixed on the lower end of the shaft 39. An integral large diameter sleeve 45 extends upwardly from the disc 44. Cutters 46 are associated with the disc 44 and act to cut hay or the like when the discs are rotated. The disc 44, the large diameter sleeve 45 and the cutters 46 constitute a drum cutter as employed in the mower of this invention.

A pneumatic tired wheel 47 is affixed to the shaft 39 above the drum cutter described above. As will subsequently be described this drum cutter is one of a series of drum cutters and more specifically is an end one of a transversely extending row of drum cutters. It is important to note that the vertical shaft 39 is in a fixed lateral position relative to the frame 10 of the mower of this invention.

A bracket 48 is welded at 49 to the torque tube 11 as best shown in FIG. 3. A forwardly projecting arm 50 is laterally swingable as shown by the dashed line position 50a in FIG. 1. A vertical pin 51 acts to hingedly join the arm 50 to the bracket 48. The pin is held in this assembly by an enlarged head 52 on the underside thereof and a transverse locking pin 53 on the top side thereof over the fixed bracket 48. The arm 50 is thus swingable in a horizontal plane about the vertical hinge pin 51 as its center. A vertical shaft 54 is journally carried on the forward end of the arm 50 and by means of collars 55, comparable to the collars 40 and 41 on the shaft 39, the shaft 54 is prevented from having separate vertical movement relative to the arm 50. A disc 56 is mounted on and carried by the shaft 54 on its lower end and is comparable to the disc 44 mounted on the vertical shaft 39 as previously described. A large diameter sleeve 57 is fastened at its lower end to the disc 56 and extends upwardly therefrom. The disc is equipped with radially disposed cutters 58. Thus the combination of disc 56, sleeve 57 and cutters 58 constitute a drum cutter which cooperates with the drum cutter on the shaft 39 to effect a mowing of hay or other grasses or the like and causes the cut hay to be windrowed. A pneumatic tired wheel 59 is mounted on the shaft 54 above the drum cutter. The wheel 59 is comparable to the pneumatic tired wheel 47 and is arranged and constructed to lie in the same plane with the wheel 47. The outer peripheries of the wheels 47 and 59 are in abutting relationship. The arm 50, the shaft 54 and the entire mower drum assembly is swingable about the hinge pin 51 as shown by the dashed line 50a of the arm 50 thereupon insuring that the outer circumferential surfaces of the adjoining tires will be or can be in abutting relationship.

The mower contains another bracket 60 welded to the tube 11 at 61 at a spaced apart position from the bracket 48. The brackets 48 and 60 are of identical construction. An arm 62 extends forwardly from the bracket 60 and similarly to the arm 50 is capable of swinging movement as shown by the dashed line 62a in FIG. 1. A vertically disposed hinge pin 63 joins the arm 62 to the bracket 60 to provide for the horizontal swinging movement of the arm 62 relative to the bracket and fixed frame of the torque tube 11.

A vertical shaft 64 is journaled in the swingable arm 62 near its forward end. Collar elements 65 are mounted on the shaft 64 to maintain that shaft in a fixed vertical position relative to the arm 62. A pneumatic tired wheel 66 is affixed to the top of the shaft 62 and although a drum cutter is not visible in the drawing it does exist beneath the pneumatic tired wheel 66 and is of identical construction to that of the drum cutters as described for the vertical shafts 39 and 54.

The mower of this invention contains still another bracket 67 which is welded at 68 to the torque tube 11 at a spaced apart position from the brackets 48 and 60. A forwardly extending arm 69, somewhat longer than the arms 50 and 62, has swingable movement as shown by the dashed line 69a in FIG. 1. A vertical hinge pin 70 joins the arm 69 to the bracket 67 and provides the means to permit the horizontal swinging movement of the arm 69.

A shaft 71, vertically disposed, is journaled in the arm 69 and is similarly provided with collar members 72 to hold the shaft vertically relative to the arm 69. A pneumatic tired wheel 73 is affixed to the upper end of the shaft 71. Again a drum cutter is mounted on the shaft 71 beneath the tired wheel 73 but is not visible in the drawings. The mower of this invention thus contains four drum cutter mower elements cooperating with each other to effect an uninterrupted cutting over an extended transverse line. The first and second drum cutters rotate inwardly toward each other and similarly the third and fourth drum cutters rotate inwardly toward each other. The overall swath of hay cut by the four adjacent cutting members tend to effect a windrowing of the cut hay at the junctures between the first and second drum cutters and the third and fourth drum cutters. Obviously the drive feature of this invention is equally operable with any number of drum cutters from two on upward.

As best shown in FIG. 1 an eyelet member 74 has a threaded shank passing through the forwardly extending arm 69. A nut 75 cooperatively engages the end of the threaded shank of the eyelet on the outside of the arm. A spring 76 has one end joined to the eyelet 74 and has its other end joined to a rod 77 at an end 78. The other end of the rod 77 is threaded as shown at 79 and extends through the fixed arm 37. A nut 80 engages the threaded portion 79 of the rod 77 and abuts the outside of the fixed arm 37. The nut 80 controls the tension adjustment of the spring 76. Because the arm 69 is pivoted for horizontal swinging movement it is apparent that the spring tension will cause the arm 69 and its integral pneumatic tired wheel 73 to be biased toward the fixed arm 37. This spring biasing of the pneumatic tired wheel 73 causes that wheel to engage its next adjacent pneumatic tired wheel 66. The wheel 66 carried on the hinged arm 62 in turn is spring biased into engagement with the pneumatic tired wheel 59 mounted on the swingable arm 50. The pneumatic tired wheel 59 is spring biased into engagement with the pneumatic tired wheel 47 on the laterally fixed arm 37. Thus the spring 76 by reason of its particular mounting causes the whole series of pneumatic tired wheels 73, 66, 59 and 47 to be frictionally engaged at their outer peripheries. Inasmuch as the pneumatic tired wheel 47 is independently driven and is in fixed lateral position the spring urging of the series of pneumatic tired wheels thereagainst causes all of the wheels to be frictionally driven. There is thus accomplished a drive for all of the drum cutters by this series of spring biased pneumatic tired wheels. Adjacent pneumatic tired wheels in the series are slightly offset from one another to insure a full transverse cutting of hay. The use of frictionally engaged pneumatic tired wheels in a single plane produces a simple drive for the mower of this invention.

The drive shaft 43 imparts rotation to the pneumatic tired wheel 47 in a clockwise direction as viewed in FIG. 1 as indicated by the arrow 81. This engagement of the peripheral surface of the wheel 47 with the peripheral surface of the pneumatic tired wheel 59 causes an opposite rotation of that wheel as shown by the arrow 82. On its other side the pneumatic tired wheel 59 frictionally engages the peripheral surface of the pneumatic tired wheel 66 and causes rotation of that wheel 66 in the direction as shown by the arrow 83. Finally the outermost pneumatic tired wheel 73 is driven in the direction of the arrow 84. It will be noted that the adjacent pneumatic tired wheels 47 and 59 rotate inwardly and rearwardly at their adjoining surfaces and similarly the juncture of the pneumatic tired wheels 66 and 73 rotate inwardly and rearwardly at their adjoining peripheral surfaces. The mower of this invention is capable of cutting a swath the full transverse width of the extent of the drum cutters and by reason of its construction acts as a windrowing device in producing windrows at the juncture of the first two drum cutters and at the juncture of the outer two drum cutters.

The means for driving the plural drum cutters of the mower of this invention comprise a pneumatic tired wheel associated with each of the drum cutters. The end one of such a series of pneumatic tired wheels is provided with a laterally fixed journal and the remaining pneumatic tired wheels are each provided with laterally shiftable journals. The shiftable journals are spring urged toward the fixed end journal thereby providing for the effective rotation of each of the drum cutters by reason of the pneumatic tired wheels having their peripheries frictionally engage one another in a single plane.

As best shown in FIG. 4 a wheel supported frame 85 carries the mower of this modification of the invention. The frame 85 includes a transversely disposed torque tube member 86 about which all of the mower elements floatingly depend. This is similar to the tube 11 as shown in FIGS. 1 to 3. One end of the tube 86 is provided with a vertically disposed plate 87 journaled thereon. A forwardly extending hitch member 88 is in turn welded to the plate 87 and acts as the means for pulling the mower by a tractor (not shown).

As best shown in FIG. 5, a downwardly and forwardly angled frame member 89 is welded to the tube 86 at the end thereof opposite the hitch member 88. A ground engaging and supporting wheel 90 is disposed adjacent the far end of the tube 86. An upwardly and forwardly angling frame member 91 journally carries the wheel 90 at 92 near its rearward end. The frame member 89 is affixed to the frame member 91 by a weld 93. Spaced above the unitary frame members 89 and 91 is an upwardly and forwardly angled frame member 94 which is welded to the tube 86 and lies in a plane at or near the downwardly and forwardly angling member 89. A fore and aft extending member 95 is located above the wheel 90 and its mounting frame members and corresponds to the member 20 in the device of FIGS. 1 to 3. This fore and aft member 95 located at the top of the mower structure is joined by a weld 96 to the upper end of the frame member 94. A chain 97 has one end thereof hooked at 98 to the upper forward end of the frame member 91. The chain 97 is comparable to the chain 22 of FIGS. 1 to 3. Inasmuch as the floating support systems of the mowers of FIGS. 1 to 3 and FIGS. 4 and 5 are identical, the spring tension adjustment mechanism within the top member 95 has not been shown in detail. It is sufficient to note that internal mechanism is the same as that shown and described for the top member 20. A hand lever 99 is mounted on the rear of the member 95 and permits the hand adjustment of the spring tension of the chain 97 in the same manner as the hand lever 29 tensions the chain 22 of FIG. 2.

Another fore and aft extending member 100 is spaced apart and parallel to the fore and aft member 95. The member 100 is located adjacent the hitch member 88 and is comparable to the member 30 as shown in FIG. 1. A ground wheel 101 is provided beneath the fore and aft member 100 and is disposed parallel to the laterally spaced apart ground wheel 90 on the outer end of the frame 85. The ground wheels 90 and 101 provide the wheel support for the frame 85 of the modified mower of FIGS. 4 and 5. A chain 102, comparable to the chain 97 on the outer end of the machine, is adapted to be hooked at 103 to a frame member 104 which is similar in construction and disposition to the frame member 91. The chain 102 extends upwardly from the frame member 104 and into the fore and aft member 100. A hand lever 105 permits manual adjustment of a spring tension for the chain 102 in the same manner as the lever 36 provides greater or lesser spring tension for the chain 32 of the device of FIG. 1. The torque tendencies of both the inner and outer end of the tube 86 are adjustably controlled by the hand cranks 99 and 105.

A fixed forwardly extending arm 106 is welded at 107 at its rear end to the torque tube 86. As best shown in FIG. 5 a vertical shaft 108 is journally carried in and supported by the arm 106. A collar 109 is affixed to the shaft 108 beneath the arm 106 and a comparable fixed collar 110 is provided on the shaft 108 on the top side of the arm 106. With this construction the collars 109 and 110 restrain the vertical shaft 108 from having separate vertical movement relative to the arm 106. A gear box 111 is mounted above the collar 110 and has the shaft 108 projecting upwardly therein. A platelike reinforcing member 112 is welded at one end to the box 111 and at its other end to the tube 86. This gives the necessary stability to the gear box 111 in the same manner as the plate 42a reinforces the gear box 42. A drive shaft 113 as shon in FIG. 4 is angled forwardly and laterally from the gear box 111 for a connection to a power take-off shaft of a tractor (not shown). Thus the drive shaft 113 brings rotational drive to the gear box 111 which contains elements to transmit rotational drive to the vertical shaft 108.

A pneumatic tired wheel 114 is affixed to and rotates with the shaft 108. It should be noted that the vertical shaft 108 is in a fixed lateral position relative to the frame 85 of the modified mower disclosed in FIGS. 4 and 5.

A bracket 115 is welded at 116 to the torque tube 86 as shown in FIG. 4. A forwardly projecting arm 117 is laterally swingable as shown by the dashed line position 118. A vertical pin 119 acts to hingedly join the arm 117 to the bracket 115. This assembly is identical to that shown in FIGS. 1, 2 and 3 for the fixed bracket 48, the forwardly projecting arm 50 and the hinge pin 51. A transverse locking pin 120 is passed through the pin 119 on the top side thereof over the fixed bracket 115. The arm 117 is thus swingable in a horizontal plane about the vertical hinge pin 119 as its center. A vertical shaft 121 is journally carried on the arm 117 and by means of collars 122, comparable to the collars 40 and 41 on the shaft 39, the shaft 121 is prevented from having separate vertical movement relative to the arm 117. A pneumatic tired wheel 123 is mounted on and carried by the shaft 121. The wheel 123 is comparable to the pneumatic tired wheel 114 and is arranged and constructed to lie in the same plane with the wheel 114. The outer peripheries of the wheels 114 and 123 are in abutting relationship. The arm 117 and its shaft 121 is swingable about the hinge pin 119 as shown by the dashed line 118 thereupon insuring that the outer circumferential surfaces of the adjoining tires 114 and 123 will be or can be in abutting relationship.

This modified mower of FIGS. 4 and 5 contains another bracket 124 welded to the tube 86 at 125 at a spaced apart position from the bracket 115. The brackets 115 and 124 are of identical construction. An arm 126 extends forwardly from the bracket 124 and similarly to the arm 117 is capable of swinging movement as shown by the dashed line 127 in FIG. 4. A vertically disposed hinge pin 128 joins the arm 126 to the bracket 124 to provide for the horizontal swinging movement of the arm 126 relative to the bracket and fixed frame of the torque tube 86.

A vertical shaft 129 is journaled in the swingable arm 126 intermediate its ends. Collar elements 130 are mounted on the shaft 129 to maintain that shaft in a fixed vertical position relative to the arm 126. A pneumatic tired wheel 131 is mounted on and carried by the shaft 126 and has its circumference frictionally engaging the wheel 123.

The modified mower of FIGS. 4 and 5 contains still another bracket 132 which is welded at 133 to the torque tube 86 at a spaced apart position from the brackets 115 and 124. A forwardly extending arm 134, somewhat longer than the arms 117 and 126, has swingable movement as shown by the dashed line 135 in FIG. 4. A vertical hinge pin 136 joins the arm 134 to the bracket 132 and provides the means to permit the horizontal swinging movement of the arm 134.

A shaft 137, vertically disposed, is journaled in the swingable arm 134 and is similarly provided with collar members 138 to hold the shaft vertically relative to the arm 134. A pneumatic tired wheel 139 is mounted on and carried by the shaft 137 and is arranged to have its circumference in friction engagement with the wheel 131. The mower of this modification of the invention thus contains four pneumatic tired wheels arranged in a generally transverse line.

As best shown in FIG. 4 an eyelet member 140 has a threaded shank passing through the forwardly extending arm 134. A nut 141 cooperatively engages the end of the threaded shank of the eyelet on the outside of the arm. A spring 142 has one end joined to the eyelet 140 and has its other end joined to a rod 143 at an end 144. The other end of the rod 143 is threaded as shown at 145 and extends through the fixed arm 106. A nut 146 engages the threaded portion 145 of the rod 143 and abuts the outside of the fixed arm 106. The nut 146 controls the tension adjustment of the spring 142. Because the arm 134 is pivoted for horizontal swinging movement it is apparent that the spring tension will cause the arm 134 and its integral pneumatic tired wheel 139 to be spring biased toward the fixed arm 106. This spring biasing of the pneumatic tired wheel 139 causes that wheel to have its circumference frictionally engage the next adjacent pneumatic tired wheel 131. The wheel 131 carried on the hinged arm 126 in turn is spring biased into circumferential engagement with the pneumatic tired wheel 123 mounted on the swingable arm 117. The pneumatic tired wheel 123 is spring biased into engagement with the pneumatic tired wheel 114 on the laterally fixed arm 106. Thus the spring 142 by reason of its particular mounting causes the whole series of pneumatic tired wheels 139, 131, 123 and 114 to be frictionally engaged at their outer peripheries. Inasmuch as the pneumatic tired wheel 114 is independently driven and is in fixed lateral position the spring urging of the series of pneumatic tired wheels thereagainst causes all of the wheels to be frictionally driven. Adjacent pneumatic tired wheels in the series are slightly offset fore and aft from one another.

The modified mower as shown in FIGS. 4 and 5 differs from the mower construction as shown in FIGS. 1, 2 and 3 in that the drum cutters are not mounted on the same shafts which carry the driving pneumatic tired wheels. Another vertical shaft 147 is mounted on the arm 106 forwardly of the vertical shaft 108 carrying the pneumatic tired wheel 114. The shaft 147 is provided at its upper end with an enlarged shoulder or collar 148 which is adapted to rest over and on the arm 106. Beneath the arm 106 and mounted on the shaft is a drum or sleeve 149 comparable to the drum 45 of FIG. 2. The lower end of the drum 149 terminates in an outwardly and downwardly flaring disc 150. Radially extending cutter elements 151 are provided at intervals around the circumference of the disc 150. This drum type cutter comprising the drum or sleeve 149, the disc 150 and its radially extending cutters 151 is identical to the drum cutter of FIGS. 1 and 2 as shown by the drum 45, the outwardly and downwardly flaring disc 44 and the radially extending cutters 46. The difference between the two modifications of mowers shown are that in the mower of FIGS. 1 and 2 the drum cutters are mounted on the same shafts with the pneumatic tired wheels and thus are directly driven whereas in the mower of FIGS. 4 and 5 the drum cutters are spaced from the axes of rotation of the pneumatic tired wheels and thus are indirectly driven. In the device of FIGS. 1 and 2 the rotational speed of the drum cutters is and must always be equal to the speed of the pneumatic tired wheels whereas in the device of FIGS. 4 and 5 the speed of the drum cutters can be varied. In the mower of FIGS. 4 and 5 the pneumatic tired wheel imparts rotational drive to the drum cutter by frictional engagement. The diameters of the pneumatic tired wheel and the drum of the drum cutter can be and are different and thus the rotational speed of the drum cutter can be varied by changing the diameters of these driving elements. In the mower modification of FIGS. 4 and 5 it is desired to obtain greater rotational speeds for the drum cutters for more effective mowing. Thus the diameter of the pneumatic tired wheel 114 is substantially greater than the diameter of the drum 149 to which that tire imparts rotational drive by frictional engagement of the circumferences thereof. Now, with a certain speed of the pneumatic tired wheel there is a substantially increased speed of the drum cutter so that the cutting elements 151 act to cleanly and easily cut the grasses and hay through which it is moved. There is a limit to the speeds which pneumatic tired wheels may be safely and efficiently driven and hence the mower of FIGS. 1 and 2 can not just be speeded up to accomplish the same result as the modification of FIGS. 4 and 5. The mower modification of FIGS. 4 and 5 shows one means of accomplishing an increase in the speed of rotation of the drum cutters relative to the speed of rotation of the driving pneumatic tired wheels.

Another vertical shaft 152 is mounted on the arm 117 at a position forwardly of the vertical shaft 121 which carries the pneumatic tired wheel 123. The shaft 152 is provided at its upper end with an enlarged shoulder or collar 153 which is adapted to rest over and on the arm 117. Beneath the arm 117 and mounted on the shaft 152 is a drum or sleeve 154 comparable to the drum 149. The lower end of the drum 154 terminates in an outwardly and downwardly flaring disc 155. Radially extending cutter elements 156 are provided at intervals around the circumference of the disc 155. The drum cutter consisting of the drum or sleeve 154, the disc 155 and its radially extending cutters 156 is frictionally driven by the tire 123 and cooperates with the drum cutter 149, 150 and 151 to cut hay and cause that hay to be windrowed at their juncture.

Another vertical shaft (not visible in the drawings) is mounted on the arm 126 at a position forwardly of the vertical shaft 129 which carries the pneumatic tired wheel 131. This second shaft on the arm 126 is provided at its upper end with an enlarged shoulder or collar 157 which is adapted to rest over and on the arm 126. Beneath the arm 126 and mounted on the second shaft is a drum or sleeve 158 comparable to the drums 149 and 154. The lower end of the drum 158 terminates in an outwardly and downwardly flaring disc 159. Radially extending cutter elements 160 are provided at intervals around the circumference of the disc 159. The drum cutter consisting of the drum or sleeve 158, the disc 159 and its radially extending cutters 160 is frictionally driven by the tire 131.

Still another vertical shaft (not visible in the drawings) is mounted on the arm 134 at a position forwardly of the vertical shaft 137 which carries the pneumatic tired wheel 139. This further shaft on the arm 134 is provided at its upper end with an enlarged shoulder or collar 161 which is adapted to rest over and on the arm 134. Beneath the arm 134 and mounted on this further shaft is a drum or sleeve 162 comparable to the drums 149, 154 and 158. The lower end of the drum 162 terminates in an outwardly and downwardly flaring disc 163. Radially extending cutter elements 164 are provided at intervals around the circumference of the disc 163. The drum cutter consisting of the drum or sleeve 162, the disc 163 and its radially extending cutters 164 is frictionally driven by the tire 139 and cooperates with the drum cutter 158, 159 and 160 to cut hay and cause that hay to be windrowed at their juncture in the same manner as hay was windrowed between the first two adjacent drum cutters.

In the operation of the mower of FIGS. 4 and 5, rotational drive is received from a pulling tractor through the drive shaft 113 to the gear box 111. Gearing within the box 111 delivers this rotational drive downwardly to the shaft 108 on which is mounted a pneumatic tired wheel 114. The wheel 114 has its circumference in frictional engagement with an adjacent pneumatic tired wheel 123 on the side thereof and is also in frictional engagement with the drum 149 of a drum cutter positioned forwardly thereof. An arrow 165 shows the direction of rotation of the tire 114 as viewed in the top plan view of FIG. 4. An arrow 166 shows that the adjoining pneumatic tired wheel 123 is rotatably driven in the opposite direction. Proceeding down the generally transverse line of pneumatic tired wheels it is seen that the wheel 123 has its circumference frictionally engaging a pneumatic tired wheel 131 for rotation thereof in the direction of the arrow 167. Similarly, the wheel 131 frictionally engages and drives the pneumatic tired wheel 139 in the direction of the arrow 168. Drive is thus imparted from the wheel 114 successively in alternately opposite directions to the wheels 123, 131 and 139.

The driven wheel 114, as previously stated, frictionally drives the drum 149 of the drum cutter and the direction of rotation of the drum cutter is indicated by the arrow 169. As viewed in the top plan view of FIG. 4 the direction of rotation of the first drum cutter in the series is clockwise. The pneumatic tired wheel 123 has its circumference frictionally engaging and rotatably driving the drum 154 in a counterclockwise direction as shown by the arrow 170. The first two drum cutters in the transverse series thus rotate inwardly toward their adjoining circumferences to cause a windrowing of the cut hay by these drum cutters to a longitudinal path defined by the juncture of those drum cutters. The pneumatic tired wheel 131 has its circumference frictionally engaging and rotatably driving the third drum 158 in a clockwise direction as shown by the arrow 171. This is similar to the first drum cutter in the series. Finally, the pneumatic tired wheel 139 has its circumference frictionally engaging and rotatably driving the fourth drum 162 in the series of drum cutters in a counterclockwise direction as shown by the arrow 172. Thus, the third and fourth drum cutters rotate inwardly toward each other as do the first and second drum cutters thereby producing another windrow path at their juncture. The swath of hay or grass cut by the series of drum cutters is thus deposited in two longitudinally extending windrows defined by the junctures between the first and second drum cutters and between the third and fourth drum cutters.

The modified mower of FIGS. 4 and 5 has a number of very important features. Many of these features are present in the mower of FIGS. 1 and 2. However, in this modified mower the construction permits the speed of rotation of the drum cutters to be increased without a corresponding increase in the driven speed of the pneumatic tired wheels. The speed of the drum cutters conducive to the most efficient mowing is attained by having the diameters of the driving wheels in the right proportion to the diameters of the drums of the drum cutters.

Figure 7:
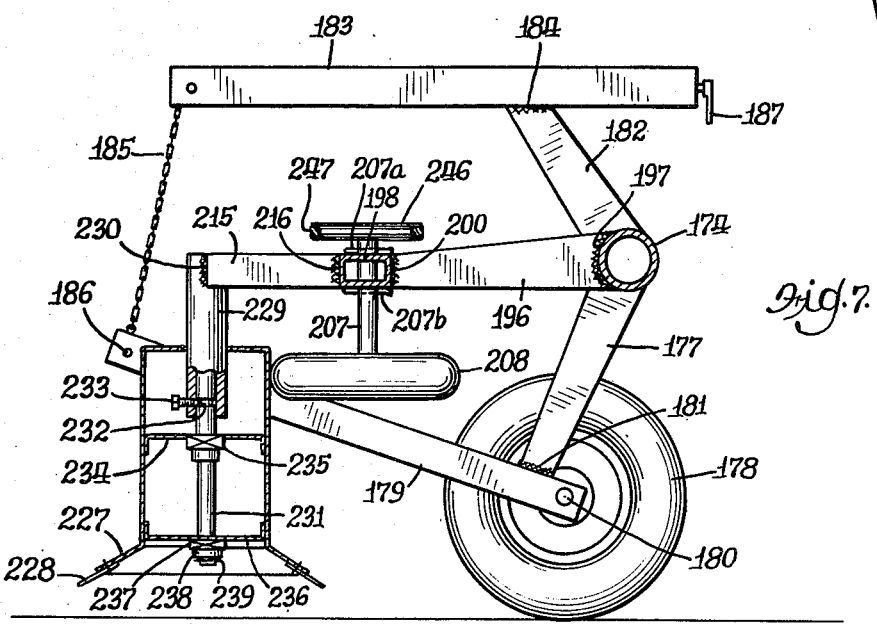
FIG. 7 is an enlarged sectional view taken on the line 7—7 of FIG. 6.
Figure 8:
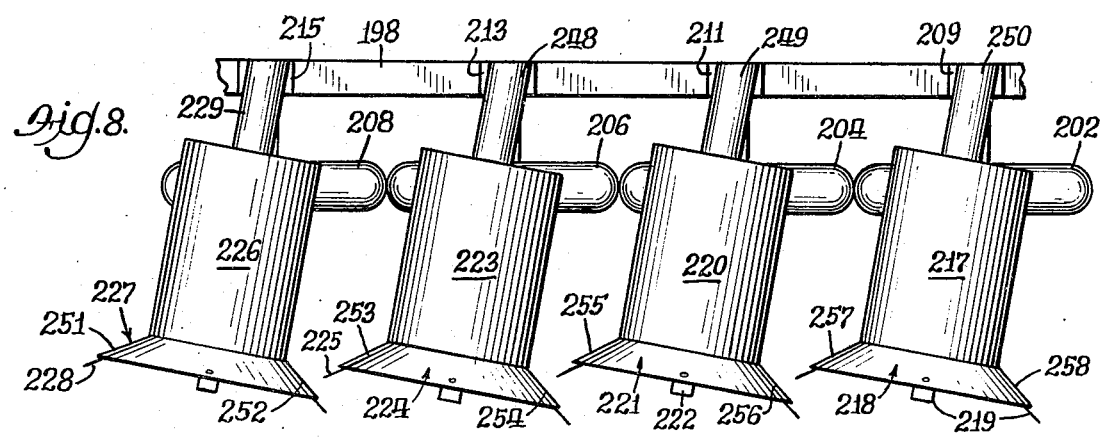
FIG. 8 is a front elevational view of the drum type mower of FIG. 6 with parts thereof broken away.

The mower modification of FIGS. 6, 7 and 8 employs a wheel supported frame 173 similar to the frames 10 and 85 of the earlier described mower modifications. The frame 173 includes a transversely disposed tube member 174 which constitutes a torque tube about which all of the mower elements depend. The tube 174 is comparable to the tubes 11 and 86 previously described. One end of the tube 174 is provided with a vertically disposed plate 175 journaled thereon. A forwardly extending hitch member 176 is in turn welded to the plate 175 and acts as the means for pulling this mower by a tractor (not shown).

As best shown in FIG. 7, a downwardly and forwardly angled frame member 177 is welded to the tube 174 at the end thereof opposite the hitch member 176. A ground engaging and supporting wheel 178 is disposed adjacent the far end of the tube 174. An upwardly and forwardly angling frame member 179 journally carries the wheel 178 at 180 near its rearward end. The frame member 177 is affixed to the frame member 179 by a weld 181. Spaced above the unitary frame members 177 and 179 is an upwardly and forwardly angled frame member 182 which is welded to the tube 174 and lies in a plane at or near the downwardly and forwardly angling member 177. A fore and aft extending member 183 is located above the wheel 178 and its mounting frame members. This fore and aft member 183 located at the top of the mower structure is joined by a weld 184 to the upper end of the frame member 182. A chain 185 has one end thereof hooked at 186 to the upper forward end of the frame member 179. A hand lever 187 is mounted on the outer rearwardly extending end of the fore and aft member 183. Adjustment of the hand lever 187 causes the chain 185 to have greater or lesser spring tension in the same manner as for the chain 22 of FIG. 2. The floating support system for the mower modification of FIGS. 6 and 7 is identical with that of FIGS. 1 and 2 and FIGS. 4 and 5 and hence will not be further described here.

Another fore and aft extending member 188 is similar to the fore and aft member 183 and is located adjacent the hitch member 176 as shown in FIG. 6. A ground wheel 189 is provided beneath the fore and aft member 188 and is disposed parallel to the laterally spaced apart ground wheel 178 on the outer end of the frame 173. The ground wheels 178 and 189 thus provide the wheel support for the frame 173 of the modified mower of this invention as depicted in FIGS. 6 and 7. A chain 190, comparable to the chain 185 on the outer end of the machine, is adapted to be hooked at 191 to a frame member 192 which is similar in construction and disposition to the frame member 179. The chain 190 thereupon extends upwardly from the frame member 192 to the fore and aft member 188. A hand lever 193 is provided on the outer end of the member 188 and is used in conjunction with the hand lever 187 to adjust the spring tension in the floating system for this mower modification.

A forwardly extending arm 194 is welded at 195 to the torque tube 174. Similarly a spaced apart parallel arm 196 is welded at 197 to the tube 174. These two arms 194 and 196 together support a transversely disposed frame member 198. In this instance the frame 198 has been shown as a tubular member which is rectangular in cross section. The forward end of the arm 194 is weldably attached at 199 to the frame member 198 and similarly the forward end of the arm 196 is welded at 200 to the frame member 198. It is to this frame member 198 which lies forwardly of and generally parallel to the torque tube 174 that carries the modified mower and its drive as shown in FIGS. 6 and 7.

A vertical shaft 201 is journaled for rotation in the frame member 198. This shaft is held against separate vertical movement relative to the frame member 198 by cross pins passing therethrough on top of and beneath the member 198. These cross pins are not shown here but are depicted for a similar shaft in FIG. 7. A pneumatic tired wheel 202 is carried on the shaft 201 beneath the frame member 198. A transversely spaced apart vertical shaft 203 is journally mounted in the frame member 198 in a manner similar to the mounting of the shaft 201. This shaft 203 carries a pneumatic tired wheel 204 beneath the rectangular tube 198. The spacing of the shafts 201 and 203 is such that the circumferential surfaces of the pneumatic tired wheels 202 and 204 are abutting as shown in FIG. 6. Another vertical shaft 205 is journally mounted in the frame member 198 in the same manner as shafts 201 and 203. The shaft 205 carries a pneumatic tired wheel 206 beneath the member 198. The wheel 206 lies in the same plane as the pneumatic tired wheels 202 and 204 and is arranged so that its circumference abuttingly engages the circumference of the wheel 204. Still another vertical shaft 207 is journally mounted in the frame member 198. As best shown in FIG. 7 a cross pin 207a passes through the shaft 207 above the frame member 198 and a cross pin 207b passes through the shaft 207 below the frame member 198. These cross pins 207a and 207b confine the shaft 207 in fixed vertical relationship to the frame member 198. This vertical restraint is the same as that utilized for shafts 201, 203 and 205. The shaft 207 carries a pneumatic tired wheel 208 at its lower end. The circumference of the wheel 208 abuttingly engages the circumference of the wheel 206. Frictional drive is accomplished between pneumatic tired wheels 202, 204, 206 and 208 by their circumferential abutting engagement. The final degree of tire abuttment is controlled by the inflation of the tires. In the mower drives of the devices previously described the frictional engagement was controlled by spring means. In this modified mower the frictional engagement is controlled by air pressure means. In the initial assembly, the tires are preferably mounted in a lowly inflated condition. After mounting, the tires are then inflated to a degree to cause their peripheries to be properly engaged for effecting frictional drive therebetween. The amount of air pressure means may be varied as desired to prevent undesirable slippage between adjacent tires but yet to permit safety slippage in the event there is some immovable object encountered in the mowing operation.

A forwardly extending arm 209 is welded at its rearward end at 210 to the frame member 198 in substantially the same transverse position as the vertical shaft 201. Similarly a forwardly extending arm 211 is welded at 212 to the member 198 at the transverse location of the shaft 203. Another forwardly extending arm 213 is welded at 214 to the frame member 198 and jibes with the transverse location thereon with the shaft 205. Still another forwardly extending arm 215 is welded at 216 to the frame member 198 and is in general transverse alignment with the vertical shaft 207. Each of these forwardly extending arms 209, 211, 213 and 215 carries a drum cutter used in effecting mowing as the machine is pulled through a hay or grass field.

FIG. 6 depicts a drum or sleeve member 217 supported beneath the arm 209. The drum 217 is equipped at its lower end with an outwardly and downwardly flaring disc 218 which has radially extending cutter members 219. Similarly a drum 220 is located beneath the arm 211 and has a disc 221 and radial cutters 222. Another drum 223 is disposed beneath the arm 213 and has a large diameter disc 224 with radial cutters 225. Another and further drum 226 is carried by and beneath the arm 215. The drum 226 has an enlarged bottom disc 227 and radial cutters 228. The mounting details of the drums 217, 220, 223 and 226 are all identical. Those details are shown in FIG. 7 with relation to the drum 226. It should be understood that the drum cutters shown in all of the mower modifications in this application are substantially as depicted in FIG. 7.

A vertically disposed pipe or tube member 229 is welded at its top at 230 to the forward end of the arm 215. A vertical shaft 231 is journally supported for rotation within the pipe 229 and extends downwardly therefrom. The shaft 231 is provided with a horizontally disposed circular groove 232 in a portion thereof within the pipe 229. A set screw 233 is threadedly engaged with the wall of the pipe and is adapted upon an inward turning to engage the groove 232 and thereupon hold the shaft 231 vertically with respect to the pipe but permits free rotation thereof with respect to the stationary pipe 229. A cross support 234 is provided within the drum 226 substantially midway of its height. A bearing 235 is carried on the support 234 on the center of the drum and journally receives the shaft 231. A spaced apart bottom cross support 236 is provided in the drum 226. The bottom cross support carries a bearing 237 in axial alignment with the upwardly spaced bearing 235 to properly support the shaft 231. A collar or washer 238 slides over the shaft 231 beneath the bearing 237 and is held thereon by a split snap ring 239 engaging a groove in the periphery of the lower end of the shaft 231. Thus, the drum cutter comprising the drum 226, disc 227 and radial cutters 228 is held by and journally supported for free rotation about the vertical shaft 231. In this drum cutter arrangement the pneumatic tired wheel immediately to the rear of the drum has its circumferential surface frictionally engaging and rotatably driving the drum by engaging the circumference of the drum near the top thereof. The tire 202 engages and drives the drum 217. The tire 204 engages and rotatably drives the drum 220. The tire 206 engages and rotatably drives the drum 223. The tire 208 engages and rotatably drives the drum 226.

The diameters of the pneumatic tired wheels 202, 204, 206 and 208 are all the same and are substantially greater than the diameters of the drums they are driving. This differential in diameters causes a change in the speed of the driven member. When, as in this case, the diameter of the driving member exceeds the diameter of the driven member the rotational speed of the driven member is greater than the rotational speed of the driving member. Thus, without driving the pneumatic tired wheels any faster it is possible in the arrangement of the modified mower of FIGS. 6 and 7 to obtain increased drum cutter speed. In some instances it is desirable for more effective mowing to rotate the cutter elements at higher speeds. With this construction greater mower cutter speeds become practical without increasing the cost of the driving system. This modification also has advantages in that the pneumatic tired wheels do not have to operate at very high speeds which is conducive to long and efficient wear of these driving tires.

As shown in FIG. 6 a driving shaft 240 is adapted to receive rotational drive from a tractor power take-off (not shown) and deliver it rearwardly to the mower of this invention. A universal coupling 241 is driven by the driving shaft 240. Longitudinally spaced apart and aligned pillow block bearings 242 and 243 are affixed to the top surface of the arm 194. A shaft 244 is journally carried in the bearings 242 and 243 and is joined at its forward end to the universal coupling 241. A vertically disposed V-pulley 245 is keyed on the shaft 244 at a position between the bearings 242 and 243 and thus is rotatably driven when the drive shaft 240 is rotated. The V-pulley is preferably disposed over the transverse frame member 198. A V-pulley 246 is horizontally disposed and is keyed to the upper end of the vertical shaft 207 as shown in both of FIGS. 6 and 7. A V-belt 247 joins the V-pulleys 245 and 246 and thus imparts the rotational drive of the horizontally disposed shaft 244 to the vertically disposed shaft 207. This is the means for getting rotational drive to the outer one of the pneumatic tired wheels 208. It is from this wheel that frictional drive is imparted to all of the series of pneumatic tired wheels and from each one of those to the forwardly mounted drum cutters.

In the front view of FIG. 8 it is evident the pipe 229 carrying the drum 226 is slightly canted. A pipe 248 supporting the drum 223 is canted similarly to the pipe 229. Pipes 249 and 250 carry the drums 220 and 217 respectively and they too are canted so that they lie parallel to the pipes 229 and 248. The canting of the drum cutter carried by the pipe 229 shows that the left side 251 of the disc 227 as viewed in FIG. 8 is raised and the right side 252 is lowered. Similarly canting of the successive drum cutters in the series brings on similar results. The disc 224 has its left side 253 up and its right side 254 down. The disc 221 has its left side 255 up and its right side 256 down. The disc 218 has its left side 257 up and its right side 258 down. The canting of the drum cutters is used to permit a slight overlap of the adjacent cutting elements without interference between those cutting elements. Overlapping of the cutting elements is desirable to insure an uninterrupted swath to be cut across the full transverse extent of the series of drum cutters. In the mower modifications of FIGS. 1 through 5 the cutter avoidance was obtained by alternately positioning adjacent cutters in a fore and aft offset. Here the canting of the drum cutters permits overlapping of the cutters because the lower right side 252 of the outermost drum cutter lies beneath the higher left side 253 of the next drum cutter. Similarly the lower right sides of the series of drum cutters are disposed beneath the higher left sides of each of the adjoining drum cutters.

The canting of the drum cutters is not so great as to impair the frictional drive of the drums by the pneumatic tired wheels. In fact this form of drive permits the drum cutter canting without any difficulty.

The direction of rotation of the pneumatic tires and the drum cutters of the modification of FIGS. 6, 7 and 8 is identical to the mower arrangement of the device of FIGS. 4 and 5 and hence will not be repeated.

I am aware that many details of construction may be varied without departing from the principles disclosed herein and I therefore do not propose limiting the patent granted hereon otherwise than as necessitated by the appended claims.

What is claimed is:

1. A drive for a mower having a wheel supported frame, a plurality of horizontally disposed cutters adapted to be rotated about their centers in a generally horizontal plane, means carrying said cutters on said frame, a plurality of horizontally disposed generally transversely positioned pneumatic tired wheels adapted to be rotated about their centers in a generally horizontal plane, means carrying said pneumatic tired wheels on said frame, means imparting rotational drive to one of said pneumatic tired wheels, means causing said pneumatic tired wheels to have frictional engagement at their adjoining surfaces, means imparting drive from said pneumatic tired wheels to said cutters, whereby said driven pneumatic tired wheel imparts drive to all of said pneumatic tired wheels and said means imparting drive from said pneumatic tired wheels to said cutters causes said cutters to be rotatably driven.

2. A device as set forth in claim 1 in which said means imparting drive from said pneumatic tired wheels to said cutters comprises each of said pneumatic tired wheels and each of said cutters having a wheel and a cutter mounted on a single shaft, said wheel drivingly mounted on said shaft, said cutter fastened to said shaft whereby rotation of each of said wheels drives each of said cutters.

3. A device as set forth in claim 1 in which said means imparting drive from said pneumatic tired wheels to said cutters comprises each of said cutters having an integral vertically disposed coaxial drum, and each of said pneumatic tired wheels frictionally engaging one of the cutter drums whereby rotation of each of said wheels drives each of said cutters.

4. A device as set forth in claim 3 in which the diameters of the pneumatic tired wheels exceeds in length the diameters of the cutter drums to thereby effectively rotate the cutters at a speed in excess of the speed of rotation of the pneumatic tired wheels.

5. A device as set forth in claim 1 in which the centers of adjacent pneumatic tired wheels are offset in a fore and aft direction thereby causing the cutters to be similarly offset to permit an effective overlap of the cutters in a transverse direction and thereby insure a full uninterrupted transverse mowing.

6. A device as set forth in claim 2 in which said means carrying said pneumatic tired wheels includes said driven one of said pneumatic tired wheels being mounted on a shaft fixed with respect to said frame, and all of said other shafts being mounted on said frame for movement toward and away from said fixed shaft, and said means causing said pneumatic tired wheels to have frictional engagement at their adjoining surfaces including spring means normally urging said non-driven shafts toward said fixed driven shaft whereby the pneumatic tired wheels are all frictionally engaged to impart drive therebetween.

7. A device as set forth in claim 3 in which said means carrying said cutters and said means carrying said pneumatic tired wheels includes said wheels and said cutters each mounted on an arm carried on said frame, the driven one of said pneumatic tired wheels being on a fixed arm and the other wheels and cutters being on an arm movable toward or away from said fixed arm, and spring means normally urging said movable arms toward said fixed arm to thereby insure frictional engagement of said pneumatic tired wheels for effective drive therebetween.

8. A device as set forth in claim 3 in which the cutters and their coaxial drums are all similarly canted relative to a vertical to permit the cutters to be slightly overlapped in a transverse direction to thereby insure a full transverse mowing without interruption at the adjoining surfaces of the cutters.

9. A device as set forth in claim 1 in which said means imparting rotational drive to one of said pneumatic tired wheels comprises a generally horizontally rotating shaft, a vertically disposed pulley mounted on said rotating shaft, a horizontally disposed pulley mounted on said pneumatic tired wheel to be driven, and a belt joining said pulleys.

10. A drive for a mower having a wheel supported frame, a plurality of horizontally disposed cutters adapted to be rotated about their centers in a generally horizontal plane, said cutters carried on said frame and arranged in a generally transverse row, a horizontally disposed circular pneumatic tired wheel concentrically joined with each of said cutters and spaced thereabove, all of said pneumatic tired wheels disposed in the same horizontal plane, an end one of said row of pneumatic tired wheels having a laterally fixed vertical journal on said frame for permitting rotation of the pneumatic tired wheel in a horizontal plane, means imparting rotational drive to said end one of said pneumatic tired wheels, the other of said pneumatic tired wheels having laterally shiftable vertical journals carried on said frame for permitting rotation of each of the pneumatic tired wheels in a horizontal plane, and spring means urging said laterally shiftable journals and their pneumatic tired wheels toward said end one of said pneumatic tired wheels causing said other pneumatic tired wheels to be frictionally driven and including their cutters.

11. A device as set forth in claim 10 in which said laterally shiftable vertical journals each comprise an arm hingedly mounted on said frame for permitting its arcuate horizontal swinging, the other free end of each arm journally carrying one of the pneumatic tired wheels, and said spring means connected to the arm carrying the pneumatic tired wheel at the end opposite the end having the laterally fixed vertical journal and extending to and connected at its other end to the laterally fixed vertical journal.

12. A device as set forth in claim 10 in which said generally transverse row of the horizontally disposed cutters comprises the offsetting of the centers of the adjacent cutters thereby permitting adjacent cutters to have a slight overlap to thereby insure the uninterrupted cutting from one end of the row of cutters to the other end.

13. A drive for a mower having a frame including a horizontally disposed beam extending transversely of the line of mower travel, ground wheels supporting the beam near its laterally outer ends, a fore and aft extending arm affixed at its rear to said beam, a cutter assembly supported on said fore and aft extending arm at a position forwardly of said beam, said cutter assembly comprising a vertical shaft, a horizontally disposed disc mounted on said vertical shaft, cutter elements associated with said disc and adapted to extend radially outwardly therefrom, and a large diameter cylindrical sleeve affixed to said disc and projecting upwardly therefrom, a pneumatic tired wheel disposed horizontally and mounted concentrically on said vertical shaft above said large diameter sleeve, said vertical shaft journally supported for rotation on said fore and aft extending arm and restrained from having separate vertical movement with respect to said arm, means imparting rotational drive to said vertical shaft, its cutter assembly, and its pneumatic tired wheel, a laterally spaced apart arm hingedly mounted relative to said beam on a vertical hinge member, said spaced apart arm extending generally forwardly from said beam, another cutter assembly mounted on said spaced apart arm arranged so that its cutter elements cooperate with the cutter elements of the fixed fore and aft extending arm to effect a mowing and a windrowing, a pneumatic tired wheel mounted on and rotatable with the second cutter assembly, said pneumatic tired wheel of the second cutter assembly having abutting engagement with the periphery of the first pneumatic tired wheel, and spring means urging the hinged arm toward the fixed arm thereby frictionally imparting rotational drive from the pneumatic tired wheel of the first cutter assembly to the pneumatic tired wheel of the second cutter assembly.

14. A device as set forth in claim 1 in which said means causing said pneumatic tired wheels to have frictional engagement at their adjoining surfaces comprises air pressure within the pneumatic tired wheels.

15. A device as set forth in claim 1 in which said means causing said pneumatic tired wheels to have frictional engagement at their adjoining surfaces comprises spring means.

* * * * *